No. 633,212. Patented Sept. 19, 1899.
T. L. PAINE.
NUT.
(Application filed Mar. 30, 1899.)
(No Model.)
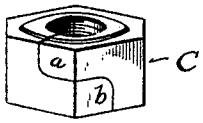
Fig. 1.
Fig. 2.
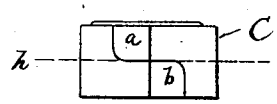
Fig. 4.
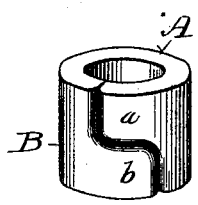
Fig. 3.
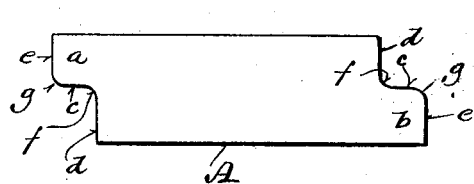
Witnesses:
Geo. N. Young.
B. C. Roloff.
Inventor:
Tracy L. Paine
By H. G. Underwood
Attorney
THE NORRIS PETERS CO., PHOTO-LITHO., WASHINGTON, D. C.

UNITED STATES PATENT OFFICE.

TRACY L. PAINE, OF MILWAUKEE, WISCONSIN, ASSIGNOR TO THE NATIONAL ELASTIC NUT COMPANY, OF SAME PLACE.

NUT.

SPECIFICATION forming part of Letters Patent No. 633,212, dated September 19, 1899.

Application filed March 30, 1899. Serial No. 711,060. (No model.)

*To all whom it may concern:*

Be it known that I, TRACY L. PAINE, a citizen of the United States, and a resident of Milwaukee, in the county of Milwaukee and State of Wisconsin, have invented certain new and useful Improvements in Nuts; and I do hereby declare that the following is a full, clear, and exact description thereof.

My invention relates to split nuts and is an improvement on the device patented March 1, 1892, and numbered 469,678; and it consists in certain peculiarities of construction, as will be fully set forth hereinafter and subsequently claimed.

In the drawings, Figure 1 is a perspective view, and Fig. 2 is a side elevation, of my improved nut in its finished condition. Fig. 3 is a view of the blank, and Fig. 4 is a view of the ring from which said finished nut is made.

The nut made under the prior patent above named formed a perfect lock and by reason of the dovetail union of the ends of the blank from which said nut was made tended to prevent undue lateral spreading or opening of the nut when it was screwed upon a bolt, and so far was satisfactory. In nuts of this class the bore of the nut is tapped slightly smaller than the diameter of the bolt to which the nut is to be applied; but it has been found in practice with the patented nut above referred to that the limit of yield inforced by the said dovetail union, together with the fact that the parts of the nut at the line of separation must necessarily ride upon each other obliquely, will usually result in endwise pressure against the threads of the bolt, as well as center contraction against the bolt, and hence, while the said patented nut will firmly hold in place when it has been applied, there is frequently great difficulty in removing the nut from the bolt and again applying it thereto owing to the injury to the threads of the bolt, and to remedy these defects is the object of my present invention.

Referring to the drawings of my present case, I show in Fig. 3 the blank A, from which my improved nut is made, said blank consisting of a strip of iron, steel, or other suitable material, the central portion of which is of rectangular form, having an integral extension (marked $a$ and $b$, respectively) at each end; but instead of making the inner edges of said extensions on oblique lines extending from a point below to a point above the longitudinal center of said strip, as in said prior patent, No. 469,678, the inner edges of said extensions follow the line of the longitudinal center of the strip, as shown at $c$ $c$, and are united to the straight vertical end portions $d$ $d$ and $e$ $e$ of said strip on rounded lines, as shown at $f$ $f$ and $g$ $g$ in said Fig. 3. The strip A is then bent around into an annular or ring form, as shown at B in Fig. 4, with the end extensions $a$ and $b$ overlapping and with the rounded convex surfaces $g$ $g$ fitting within the rounded concave surfaces $f$ $f$ of the said strip. The ring B is then put into a die of the proper shape—for example, one with a hexagonal opening—and pressed into the required shape, after which the bore in the nut is tapped and the article is complete. As will be seen by the dotted line $h$ in Fig. 2, the slit in my finished nut C cannot extend, as in the said prior patent, from the top of the nut to a point below the horizontal center and thence to a point above said center and down to the bottom, and hence the dovetail lock of said prior nut is avoided and rendered impossible, while retaining all of the meritorious features of said prior patented nut, augmented by the advantages consequent upon the peculiarities of my improved construction.

Proper bolts are made of standard sizes, and I have discovered that with my nuts made as hereinbefore described the nuts should be tapped with minus taps one one hundred and twenty-eighth undersize of the bolts for which they are intended in order to give the best results. When this is done and the nut is applied, the nut at the line of the split will open about one sixty-fourth of an inch, and the tendency of the nut to close will hold it upon the bolt with a constant grip, while at the same time this puts no extra strain endwise of the bolt or against the threads, as did the lock-nut made under said prior patent, and hence my present nut can be repeatedly removed from or replaced on its bolt without wear or injury of the threads and may even be readily applied over rusted or battered screw-threads on a bolt, which would prevent the use of any other nut or render it difficult, if not impossible.

It will be noted that the vertical portions of the ends of the nut-blanks (marked $d\,d$) and the vertical portions of the ends of the integral extensions $a\,b$ of said blanks (marked $e\,e$) are of less than one-half of the height of the strip or blank and that said vertical portions $d\,e$ at each end of the blank are united on rounded lines $f$ and $g$ and intermediate line $c$, the latter line following the line of the longitudinal center of the strip or blank, and from this it follows that in the nut made from this strip I entirely obviate the lateral lock caused in the nut of the prior patent, No. 469,678, (on which this is an improvement,) by reason of the said vertical end portions of the strip and extensions in said prior patent being of more than one-half the height of the strip or blank, and apart from this the substitution of the rounded edges $f\,g$ for the sharp angular edges of the prior patent is found to be a great gain in the ready manufacture of my nut, as the meeting edges of the nut-ring shown in Fig. 4 are more rapidly and easily forced together than with the former construction, thereby greatly cheapening the cost of manufacture, the said edges uniting longitudinally on an ogee line instead of on a straight oblique line, there being in my nut blank and ring no portion of the metal of the said extensions projecting below or above the horizontal central line thereof.

Having thus described my invention, what I claim as new, and desire to secure by Letters Patent, is—

1. A nut provided with a slit extending in vertical lines from the top and bottom of the nut, and from different points of the bore, through the nut to points adjacent to the center, the vertical lines of the slit extending less than half the height of the nut, and being united by rounded lines merging into a lateral longitudinal line, whereby the nut will hold its place upon a bolt without being locked against lateral expansion.

2. A split nut having a plurality of vertical faces of equal extent, the line of separation of said split extending downward from the top of the nut to a point above the horizontal center, from the bore to and through one face of said nut and thence in a rounded line to said horizontal center, along said horizontal center through the adjacent face of the nut, thence in a rounded line to a point below the said horizontal center, and thence down to and through the bottom of the nut, so that one face has its upper right-hand corner or portion separated therefrom, and the adjacent face has its lower left-hand corner or portion separated therefrom, the remaining faces of said nut, besides the two adjacent faces just named, being free from any interruption or line of separation.

In testimony that I claim the foregoing I have hereunto set my hand, at Milwaukee, in the county of Milwaukee and State of Wisconsin, in the presence of two witnesses.

TRACY L. PAINE.

Witnesses:
H. G. UNDERWOOD,
B. C. ROLOFF.